May 14, 1957

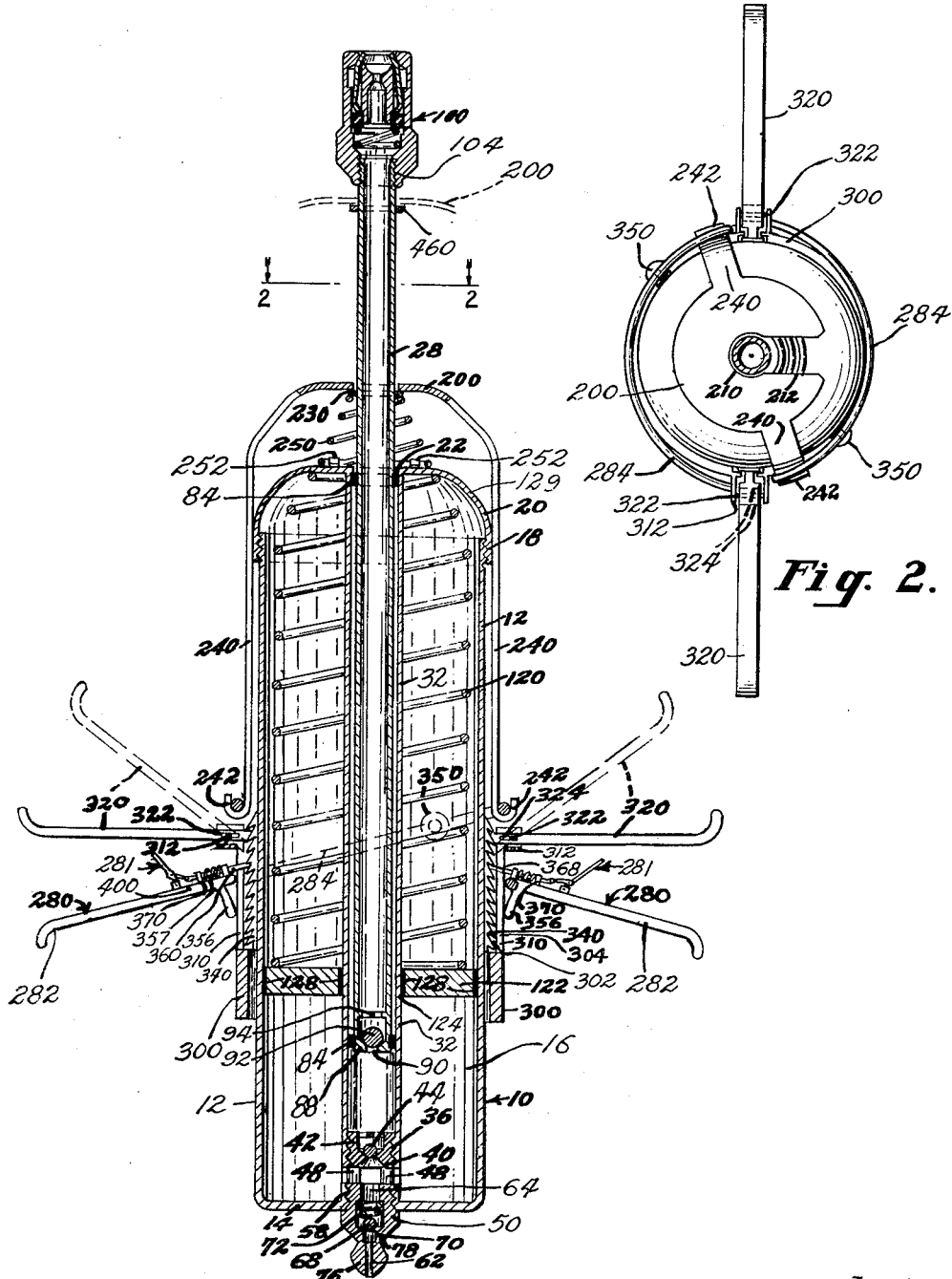

P. L'HEUREUX 2,792,154

RATCHET LEVER HAND GREASE GUN

Filed Aug. 29, 1955

INVENTOR.
Phillias L'Heureux
BY A. Hiram Sturges
attorney

United States Patent Office 2,792,154
Patented May 14, 1957

2,792,154

RATCHET LEVER HAND GREASE GUN

Phillaus L'Heureux, Omaha, Nebr.

Substituted for abandoned application Serial No. 319,359, November 7, 1952. This application August 29, 1955, Serial No. 530,990

3 Claims. (Cl. 222—259)

This invention relates to grease ejectors and more particularly this invention provides an improved hand operated grease gun.

A particular object of the invention is to provide a grease gun having a construction for making possible many varied uses such as, for example, use as a hand operated grease gun, as a ratchet-lever operated grease gun, or as a filler-pump for filling other grease guns.

Another object is to provide a grease gun the length of the greasing stroke of which can be rapidly changed from a short powerful stroke for average greasing to an extra long stroke for the filling of much larger than ordinary grease fitting reservoirs.

The advantage of having a long stroke available is for the greasing of those grease fittings which have large grease reservoirs as, for example, the filling of a gear housing requires a considerable amount of grease and to do this with an ordinary grease gun would mean that an exorbitant amount of time would be required to fill the larger grease reservoir. Sometimes such grease fittings are so large as to cause the operator to have to pack them by hand, this taking an undue amount of time.

Particular objects are to have a grease gun capable of a long pumping stroke for the dual purpose of filling unusualy large grease fitting reservoirs and for filling other hand guns.

A particularly great object and advantage is in the provision of quickly detachable lever handles which can be entirely dismantled and removed for leaving a hand gun which can be operated with the push of the body weight of the operator alone.

A further object of this invention is to provide the farmer and machinery maintenance man with a grease gun which will in one unit provide the advantages of a gun having handles, and, because of the easy removability of the handles, also provide the advantages of a gun not having handles.

A further object is to provide a grease gun capable of being shifted into three different positions of relative power and volume of output per unit of time. In comparison with high gear on an automobile, this gun has a high gear when its long stroke is being used at low pressure, it has a second shift position, comparative to the second gear in an automobile, when more power is needed and lesser speed is needed, which is the case when the gun is being operated at a second shorter stroke position without the use of ratcheting, and a third shift position, comparable to low gear on an automobile, is realized when ratcheting is used. The most commonly used and normal position is the second position described. This second position is used with the rear handles, being used as levers, and with their ratcheting mechanism disengaged.

Another object of the invention is to provide a grease gun which is operated using the forward push of the weight of a man, the weight of the gun functioning as a hammer because of its forward moving inertia, and the rearward lever arms also being pushed forwardly for operation. This latter motion is done while the man's hands are pulling rearwardly on the forward handle in a gripping motion.

A particular advantage is in the provision of a ratchet mechanism of a very low gear ratio for considerably more power than is customary in the hand grease gun. This makes possible effective greasing with a lesser exertion by the operator whereby there is less fatigue in the greasing of the great many fittings common to most machinery, and whereby frozen fittings can be broken open and greased.

Another object is to provide a hand grease gun which can be filled through a fitting at its rearward end, the fitting having direct connection to the grease reservoir of the gun whereby the grease need not pass through a tube of considerable length to reach the grease reservoir, as is common in hand guns of the prior art.

Yet another object of the invention is to provide a device for the purpose described which is sturdy and durable in construction, reliable and efficient in operation, and relatively simple and inexpensive to manufacture, assemble and utilize.

This application is a continuation in part of the applicant's co-pending patent application Serial No. 319,359, filed November 7, 1952.

In the drawings:

Figure 1 is a side elevation of the hand grease gun of this invention with the forward portion thereof broken away for showing the interior in cross section;

Figure 2 is a view in section taken along the line 2—2 of Figure 1.

Figure 3:
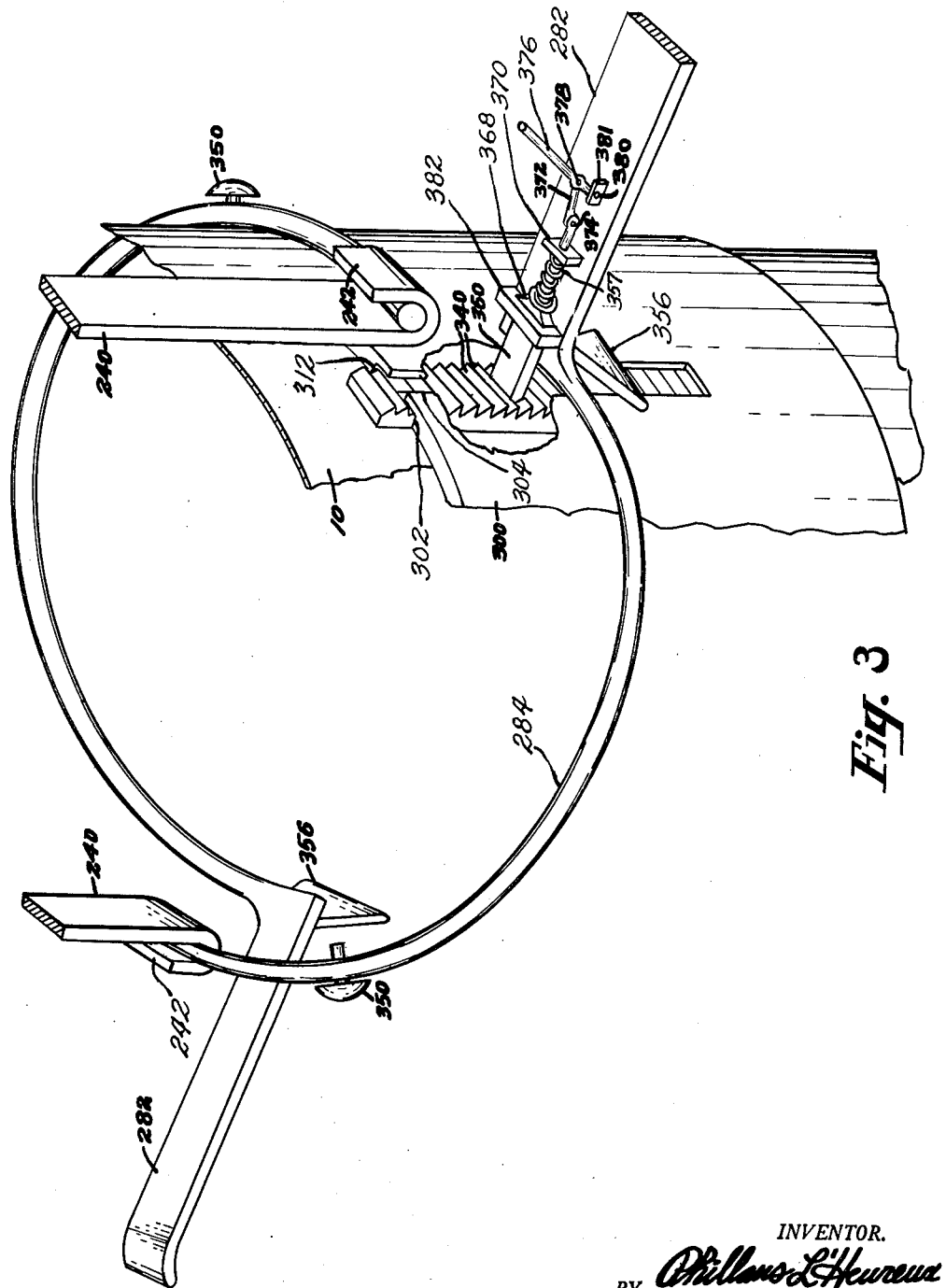
Figure 3 is a perspective view of the rear levers and with a ratchet and pawl assembly being shown on only one of the levers for convenience of illustration, adjacent broken away sections of the sleeve cylinder and saddle straps.

The grease gun of this invention is generally shown at 10 of Figure 1 and includes a main housing having cylindrical side wall 12 and a closed lower end 14 attached thereto.

The cylindrical side wall 12 has a hollow interior 16 which functions as a grease reservoir.

The upper end of the cylindrical wall 12 is externally threaded at 18 for receiving thereon an internally threaded cap 20. The cap 20 has an opening 22 therethrough, for slidably receiving a reciprocating tubular outlet plunger 28, which latter has a portion disposed outwardly of the cap 20 and a portion disposed inwardly thereof and extending deeply into the housing 12, as shown in Figure 1.

The plunger 28 is slidably disposed in a pipe-like inner housing 32, which is attached to the cap 20 at its upper end and around its circumferance for sealing the hollow interior of the housing 12 and cap 20. At its lower end the inner housing member 32 is spaced apart from the lower wall 14 of the housing 12 and is internally threaded as seen at 36 for receiving an assembly 40, therein, the member 40 having a valve housing 42 at its inner end which is externally threaded and the valve housing 42 has a check valve 44 therein which is adapted to permit grease to pass upwardly thereto but which will close and prevent grease under pressure from passing downwardly therethrough.

The valve 42 is secured by bridge members 48 to a fitting 50 which has an externally threaded outer housing received in an inwardly extending annular flange 58 which is internally threaded and which is attached to the bottom wall 14 around the circumferance of an opening therethrough.

The fitting 50 has a hollow interior and is open at both ends having a narrower passageway 62 extending inwardly from its outer end and having a larger passageway 64 extending into its interior from its inner end. A check valve is provided in the interior of the fitting 50 and the check valve has a ball 68 pressed downwardly to seat against a shoulder 70 by a compression spring 72 whereby grease can flow upwardly into the reservoir 16 through the fitting 50 but cannot flow downwardly through the fitting 50. The fitting 50 has the shape of a ball 76 at its lower end as viewed externally and has a larger outwardly flaring upper exterior contour as seen at 78 extending upwardly from the ball shaped lower end 76.

The tube 28 which functions as a reciprocating plunger is provided with piston rings or gaskets 84 at its upper and lower ends for slidably engaging the inner pipe-like housing 32. The latter has a bottom wall 88 having an opening 90 therethrough which is adapted to be sealed by a ball 92 which latter is held in place by upper retaining members 94 whereby the ball 92 functions as a check-valve and will permit grease to enter through the opening upwardly but will prevent grease from passing downwardly past the ball 92.

At its upper end the reciprocating plunger tube 28 has a female zerk fitting 100 threadedly secured to the threaded upper end 104 of the plunger 28. The zerk fitting 100 is of a type now in common use for the greasing of a sealed bearing on farm implements, contracting machinery and the like. Inside of the housing 12 a long compression spring 120 is disposed bearing against the inner side of the cap 20 and forcing downwardly upon the piston 122 which is disposed transversely across the interior of the housing 12 and which has a center opening 124 for receiving the pipe-like inner housing member 32. Gasketing material 128 is disposed around the walls of the opening 124 and around the outer circumference of the piston 122 for tight slidable contact with the housings 12 and 32.

The purpose of the spring 120 is to push grease downwardly in front of the piston 122 and toward the check valve 40 to assist in the evacuation of grease from the reservoir 16.

A pulling member 200 having a center opening 210 is disposed on the plunger 28 above the cap 20 with the plunger 28 received in the opening 210. A passageway 212 extends to the exterior of the member 200 which latter has a preferably circular upper portion. The passageway 212 is to receive the plunger 28 for the placing of the plunger in the pulling member 200 immediately above an anchor 230 which latter is rigidly secured to the plunger 28 at a point spaced above the cap 20, the anchor 230 being of a larger size than the opening 210 whereby the pulling member 200 cannot move downwardly past the anchoring member 230.

The pulling member 200 is further provided with side straps 240 which extend downwardly on opposite sides of the member 200 in parallelism with the sides of the housing 12. The lower ends of the straps 240 are provided with upturned hooks 242 for a purpose later described.

A coiled compression spring 250 is disposed between the cap 20 and the anchor 230, the spring 250 being held in place by clips 252 which attach it to the cap 20.

Two pivoting levers 280 are provided which shall be called the rearward hand levers. The levers 280 have handle portions 282 which are disposed extending radially outward from opposite sides of the housing 12. The levers 280 are further provided with arcuate portions 284 which are disposed spaced apart from the sides of the housing 12 but closely adjacent thereto. The portions 284 are each attached at one end to the respective inner end of the handle portion 282 of a respective lever 280 at a point spaced apart from the side of the housing 10. The other ends of each respective arcuate portion 284 extend to those sides of the housing 12 which are substantially opposite to the respective handle portion 282 and there the said opposite ends are respectively received in a different one of the hooks 242 at the lower end of the respective strap 240 which latter is disposed respectively slightly to the adjacent side of an opposite hand lever handle portion 282 as best seen in Figure 1.

A sleeve 300 is slidably disposed about the exterior of the housing 12 and the sleeve 300 has a kerf 302 extending into its under side and extending upwardly and downwardly for slidably receiving the ratchet teeth 340. One wall of the kerf 302 can be seen in Figure 1 and the inner wall of the kerf can be seen in dotted lines in Figure 1 at 302. A slot 304 is disposed extending through the sleeve 300 outwardly through the outer wall of the kerf 302. The slot 304 extends forwardly and rearwardly similar to the kerf 302. The slot 304 is of a lesser transverse width than the kerf 302. The sleeve 300 has upwardly extending mounting members 310 attached thereto which extend vertically upward and which have outturned upper ends 312 which function as fulcrums for forward hand levers 320 which latter are radially disposed with respect to the housing 12.

The forward hand levers 320 are secured by means of pivot pins 322 to the mounting portions 312, the pins 322 extending through radial or longitudinal slots 324 in the forward hand levers 320. The inner ends of the hand levers 320 are beveled upwardly and inwardly from their under sides to provide points at their upward and forward sides as shown in Figure 1. The said points are for engaging in the ratchet teeth 340 which latter are secured to the housing 12.

It is to be noted that the ratchet teeth 340 slant downwardly and outwardly on their under side and that the pointed inner ends of the forward hand levers 320 are complementally shaped whereby the possibilities of slippage along the ratchet teeth will be eliminated.

The rearward hand levers 280 have their arcuate sections 284 pivotally attached to the sleeve 300 at an upper end of the sleeve 300 by means of pivot pins 350, best seen in Figure 2.

The pivot pins 350 are disposed close to but spaced apart from the strap 240 to which each is respectively attached.

It will be seen that when the levers 280 are pushed forwardly at their handle ends that then the saddle or yoke 200 will be pulled downwardly with respect to the sleeve 300.

On the lower side of the handle portion of the levers 280 are downwardly extending bumper portions 356. The portions 356 are attached to the inner end of the handle portions 282 but are disposed on the straight portions 282 and not on the arcuate portions 284. The bumpers 356 are for the purpose of engaging the sleeve 300 on that surface thereof which is disposed to one side of the slot 304. In order to do this, the bumpers 356 extend downwardly with wide outwardly flaring lower ends, the terminal ends thereof being horizontal for engaging the sleeve 300 so as to snub the rearward levers 280 to prevent the downward movement of the outer ends beyond the points at which the bumper members 356 engage the portion 310.

Each rearward lever 280 further has a ratchet engaging mechanism generally indicated at 281 attached thereto at the inner end of the handle portion 282. The ratchet engaging assemblies include elongated pawl members 360 which are disposed along the upper sides of the handle portions 282. The pawl members 360 are urged toward the ratchet teeth 340 by springs 357 which latter push against shoulders 368 of the pawls 360.

The rearward ends of the springs 257 press against mounting members 370 which are secured to and mounted on the handle portions 82. The mounting members 370 are provided with openings therethrough for receiving the pawl members 360.

The pawl members 360 extend outwardly on the outer sides of the mountings 370 considerable distances and there each pawl members 360 is pivotally attached to a linkage 372 by a pin 374.

The links 372 are pivotally attached to levers 376 by pins 378 above the lower ends of the levers 376. The levers 376 are attached by pins 380 at their lower ends to ears 381 mounted on the lever handles 282.

The pins 378 are so positioned that when the levers 376 are swung against the handle 282, the pin 378 will be closer to the handle 282 than a line between pins 374 and 380 so that the mechanism is in what is called an "over-center" position.

The inner ends of the pawls 360 are slidably held by other mounting members 382 which slidably hold the pawls 360 and which are secured to the handles 282.

As thus described, it will be seen that in operation the gun can be filled through the fitting 50 filling the reservoir 16 and that it can be used for filling the reservoirs of grease fittings in several different ways.

The first way is to have the saddle or yoke 200 disposed in the dotted line position partially shown in Figure 1 wherein the yoke 200 engages an anchoring member 460 fixed to the plunger 28 at its outer end. The pulling on the saddle 200 by hand when it is in this position will afford a large stroke for pumping a considerable volume of grease at a lower pressure.

When the saddle is in the full line position shown in Figure 1 it can be operated by hand and without the use of levers for a shorter pumping stroke. But the full line position of the saddle 200 as seen in Figure 1 is primarily for use with the levers. It can be used with the levers 280 alone and with forward levers 320 in outward disengaged positions, or it can be used with the forward levers 320 engaged and being walked downwardly on the teeth.

When the latter is being done, a ratcheting takes place because as the levers 320 are pulled downwardly at their outer end, the sleeve 200 to which the levers 320 are attached, moves downwardly with respect to the teeth 340. This in turn causes the handle ends of the rearward levers 280 to move downwardly by sliding along the portions 310 as the action of the forward levers 320 will cause the pawls 360 to slide downwardly along the ratchet teeth 340 tooth by tooth.

As the pawls 360 move downwardly a tooth each, the forward levers 320 are free to take another bite on the ratchet teeth.

It will be seen that the outer ends of the levers 280 are an effective hold on the saddle 200 when the forward levers 320 are being pulled rearwardly because of the downwardly extending portions 356 which skid and slide along the portions 310 preventing the outer ends of the levers 280 from moving downwardly unduly.

The grease gun of this invention can be used in three different ways for three different relative amounts of grease flow and power. The ratcheting motion is especially effective for putting grease into frozen grease fittings where a maximum of power is necessary.

From the foregoing description, it is thought to be obvious that a ratchet lever hand grease gun constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A grease gun comprising an outer housing having an opening therethrough at one end, an elongated inner housing disposed inside said outer housing, said inner housing being hollow and being joined to said outer housing around the edges of said opening so as to form a grease reservoir between said inner housing and said outer housing, said inner housing being open at that end thereof which is disposed adjacent said opening in said outer housing, check valve means adjacent the inner end of said inner housing for permitting grease to enter said inner housing from said reservoir and preventing grease from passing from said inner housing outwardly into said reservoir, a hollow plunger slidably disposed in said inner housing and extending through the open outer end thereof, check valve means at the inner end of said hollow plunger for permitting grease to enter into said plunger from the interior of said inner housing, means attached to the outer end of said plunger for connection to a grease fitting, and means attached to the closed end of said outer housing for admitting grease thereinto.

2. The construction defined in claim 1 which further includes ratchet lever means for causing said plunger to be forced inwardly of said inner housing.

3. The combination described in claim 1 in which ratchet lever means is provided for causing said plunger to be forced inwardly of said inner housing, said ratchet lever means including at least two lever handles adapted to be operated for initiating said forcing motion and further includes a second pair of lever handles disposed in positions with respect to said first pair of lever handles, respectively, such that an operator can grip with his left hand a left hand handle of said first pair and the left hand handle of said second pair, and likewise an operator can grip with his right hand a right hand handle of said first pair and the right hand handle of said second pair and by squeezing his hands together can cause said forcing motion.

No references cited.